United States Patent

Sakaigawa et al.

[11] Patent Number: 5,812,230
[45] Date of Patent: Sep. 22, 1998

[54] LIQUID CRYSTAL DISPLAY AND MANUFACTURING METHOD THEREOF WITH ISOTROPIC MICROSTRUCTURAL ELEMENTS BETWEEN SMECTIC LAYERS

[75] Inventors: Akira Sakaigawa, Kawasaki; Kazuyuki Kishimoto; Mitsuhiro Koden, both of Kashiwa, all of Japan

[73] Assignee: Sharp Kabushiki Kaisha, Osaka, Japan

[21] Appl. No.: 728,200

[22] Filed: Oct. 10, 1996

[30] Foreign Application Priority Data

Dec. 27, 1995 [JP] Japan .................................. 7-341904

[51] Int. Cl.$^6$ .............................. G02F 1/13; G02F 1/1333
[52] U.S. Cl. .............................. 349/166; 349/85; 349/188
[58] Field of Search ................................ 349/166, 88, 92, 349/188, 85

[56] References Cited

U.S. PATENT DOCUMENTS

| | | | |
|---|---|---|---|
| 4,305,807 | 12/1981 | Somlyody | 349/166 |
| 5,138,472 | 8/1992 | Jones et al. | 349/166 |
| 5,140,448 | 8/1992 | Bone et al. | 349/166 |
| 5,200,848 | 4/1993 | Hanyu et al. | 349/188 |
| 5,333,074 | 7/1994 | Hikmet | 349/88 |
| 5,434,985 | 7/1995 | Pirs et al. | 349/88 |
| 5,583,671 | 12/1996 | Yoshida et al. | 349/188 |

FOREIGN PATENT DOCUMENTS

| | | | |
|---|---|---|---|
| 4-344614 | 12/1992 | Japan | 349/88 |
| 6-194365 | 7/1994 | Japan . | |
| 7-248489 | 9/1995 | Japan . | |

OTHER PUBLICATIONS

H. Fujikake, et al., "Gray–Scale Memory of Polymer–Dispersed Surface Stablized Ferroelectric Liquid Crystals", Presentation Document No. 3,1120 (1994) in the 41st Associated Convention Related to Applied Physics, p. 1120, 29–p–P–15.

N.A. Clark, et al., "Submicrosecond Bistable Electro–optic Switching in Liquid Crystals", Appl. Phys. Lett. 63(11), Jun. 1, 1980, pp. 899–901.

*Primary Examiner*—Anita Pellman Gross
*Attorney, Agent, or Firm*—David G. Conlin; William J. Daley, Jr.

[57] ABSTRACT

A liquid crystal display element is manufactured as follows: First, a mixture containing a ferroelectric liquid crystal (FLC) composition and a monofunctional monomer is injected into the space between opposing two electrode substrates, each of which is constituted by a substrate, an electrode, an alignment film and a polarization plate; next, the mixture is heated by irradiating it with ultraviolet light to a temperature at which the FLC composition exhibits a nematic phase or an isotropic phase so that the monomer is polymerized, and then it is cooled off. With this arrangement, isotropic micro structural elements, which locally give different threshold-value characteristics in the above-mentioned mixture, are formed into a striped structure so that a liquid crystal layer is formed. This striped structure is formed when the polymer that has been formed as a result of the polymerization is allowed to be sandwiched between smectic layers in the FLC composition during the cooling process. Consequently, it becomes possible to make the size of domains smaller as compared with the size of a pixel, and to uniformly distribute the domains over a wide range; thus, gray scale display of a liquid crystal display element is achieved.

29 Claims, 9 Drawing Sheets

FIG.12(c) INTERMEDIATE STATE 2

FIG.12(b) INTERMEDIATE STATE 1

FIG.12(a) BRIGHT STATE

APPROXIMATELY 0.3mm

LIQUID CRYSTAL DISPLAY AND MANUFACTURING METHOD THEREOF WITH ISOTROPIC MICROSTRUCTURAL ELEMENTS BETWEEN SMECTIC LAYERS

FIELD OF THE INVENTION

The present invention relates to a liquid crystal display element which can achieve gray scale display and a manufacturing method thereof, and more particularly concerns a liquid crystal display capable of providing gray scale display.

BACKGROUND OF THE INVENTION

At present, liquid crystal display elements have been widely used in the field of flat-panel displays. Among these, the TN (Twisted Nematic) type display elements, which have advantages such as low driving voltage and low power consumption, have been most widely used as low-quality display elements.

However, the response speed of the TN type display elements is inferior to a great degree, as compared with the response speed of display elements of the light-emission type, such as cathode ray tube, electro-luminescent, or plasma displays. Further, the TN type display elements that have a twisted angle set in the range of 180° to 270°, that is, the so-called STN (Super Twisted Nematic) type display elements, have been developed, resulting in a drastic increase in the display capacity. However, these STN type display elements still have a limitation in improvements in the response speed.

Recently, display elements, in which each pixel of the TN-type display element is provided with a switching element, have been introduced in the market. Since most of these display elements have thin-film transistors (TFT) as the switching elements, they are referred to as the TFT-type display element, and expected to have future developments as liquid crystal display elements suitable for high-density, large-capacity and full-color display.

However, since the TFT-type display elements are manufactured by adopting semiconductor-manufacturing techniques, the available screen size is limited to as small as ten and several inches, and the cost of production is expensive. Moreover, the time-dividing capability of the TFT-type display element is said to be limited to approximately 1000 lines.

Here, a display method using ferroelectric liquid crystal has the possibility of achieving large screens not less than ten and several inches with reduced production costs, an advantage that have not been achieved by TFT-type display elements. This possibility has been suggested in "Applied Physics Letters" 36, (1980) p.899 written by N. A. Clark and S. T. Lagerwall.

The above-mentioned display method, which utilizes a chiral smectic phase, such as a chiral smectic C phase, that exhibits a ferroelectric property, is generally referred to as the surface stabilized ferroelectric liquid crystal (hereinafter, referred to as SSFLC) display method. The SSFLC display method has been studied by electric appliance makers and material makers so as to introduce it to their products, and improvements in its characteristics have been made for this purpose.

The main advantages of ferroelectric liquid crystal (hereinafter, referred to as FLC) are high-speed responsibility, good memory property and wide viewing angle. Since such advantages suggest that the SSFLC method will provide displays with large capacity, the SSFLC method is highly prospective in its practical use.

However, the main disadvantage of the SSFLC method is that since SSFLC exhibits a bistable property wherein it is basically stabilized in two orientation directions, it is difficult to achieve gray scale display.

Figure 11A:
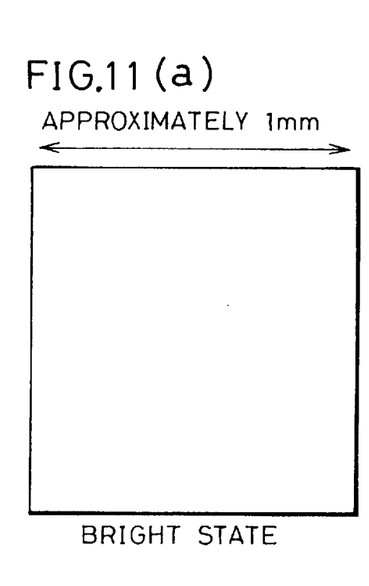
FIG. 11(a) shows the bright state of the FLC composition.
Figure 11B:
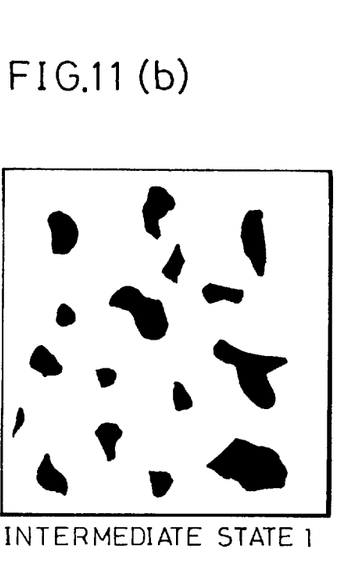
FIG. 11(b) shows one example of an intermediate state of the FLC composition.
Figure 11C:
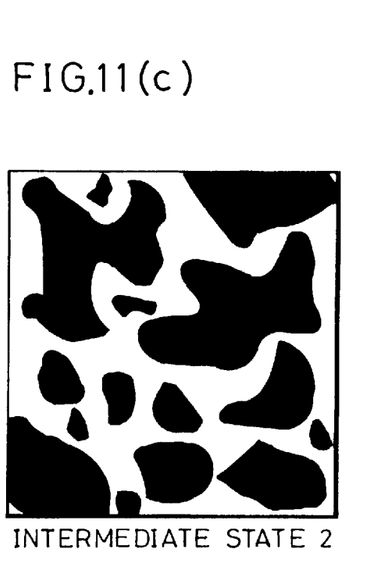
FIG. 11(c) shows another intermediate state of the FLC composition.

As illustrated in FIGS. 11($a$) through 11($c$), in the common FLC, as the width of a pulse voltage to be applied to a pixel is increased from the bright state, domains appear and the domains change to an intermediate state 2 through an intermediate state 1. In this change, the domains expand abruptly in response to the change in the pulse width, and become larger individually. Further, since the threshold-value characteristic is constant irrespective of locations, the areas of the domains can not be desirably controlled due to factors, such as the surface state of the liquid crystal cell, the effective electric field to be applied to the liquid crystal cell and the nonuniformity in temperature. As a result, the domains expand irregularly. In this manner, the common FLC is not suitable for gray scale display.

In order to solve this problem, several methods for achieving gray scale display by utilizing FLC have been proposed.

For example, Japanese Laid-Open Patent Publication 194635/1994 (Tokukaihei 6-194635) discloses a method for forming a structural element wherein non-reactive chiral liquid crystal molecules are captured in an anisotropic three-dimensional micro structural element that has been made of a polymeric substance. With this arrangement, minute adjacent domains, which have polarization directions opposing to each other, can be stabilized by the micro structural element. Thus, the gray level can be maintained even in a non-electric field state.

Figure 12:
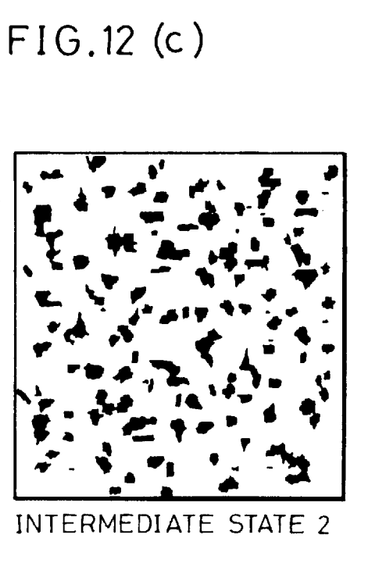
FIG. 12(a) shows the bright state of the liquid crystal display element.
FIG. 12(b) shows one example of an intermediate state of the liquid crystal display element.
FIG. 12(c) shows another intermediate state of the liquid crystal display element.

As illustrated in FIGS. 12($a$) through 12($c$), in a liquid crystal display element containing the above-mentioned three-dimensional micro structural elements, as the width of a pulse voltage to be applied to a pixel is increased from the bright state, domains appear and the domains change to an intermediate state 2 through an intermediate state 1. In this change, the domains gradually expand in response to the change in the pulse width, and the number of domains gradually increases. Here, FIGS. 12($a$) through 12($c$) show the change of domains within 1 mm square.

Moreover, Japanese Laid-Open Patent Publication 248489/1995 (Tokukaihei 7-248489) and Fujikake et al. (see papers No. 3,1120 (1944) in the 41st Associated Convention related to Applied Physics) have reported that gray scale display can be obtained by injecting a mixed solution of FLC and a photo-setting prepolymer and by polymerizing both of the substances through light irradiation. In this method, composite elements (micro polymer) between the FLC and the resin are obtained by subjecting the prepolymer to photopolymerization under a temperature at which the FLC exhibits a nematic phase, and through this process, a striped domain structure is formed. Then, the area of a region to be switched is controlled by utilizing the fact that the respective domains have different threshold-value characteristics; thus, gray scale display can be obtained.

However, when the three-dimensional micro structural elements, obtained by the former technique, are adopted, the sizes of domains to be formed in the liquid crystal are randomly determined. For this reason, it is difficult to control the uniformity of the domain size, and the areas of domains cannot be desirably controlled upon application of the pulse voltage. Further, since each of the domains is larger than the actual size of a pixel (approximately, 0.3 mm square), it is practically impossible to display gray shades by using the above-mentioned technique.

Moreover, since the polymer molecules themselves, which constitute the three-dimensional (anisotropic) micro structural elements, are orientated, it is considered that the three-dimensional micro structural element is a structural element wherein it is orientated together with the liquid crystal structural element or liquid crystal. For this reason, when micro structural elements with a high concentration (5 to 60% by weight) are formed in the liquid crystal layer, a great interaction occurs between the micro structural elements and the FLC molecules. Then, this interaction gives adverse effects on the switching operation to a great degree, thereby resulting in difficulty in the high-speed driving of the FLC.

As described above, the former technique is not suitable for high-precision display. Furthermore, the presence of three-dimensional micro structural elements with a higher concentration not only causes light scattering, but also makes a disturbance in the uniform oriented state of the FLC molecules, thereby reducing the contrast of display images.

On the other hand, in the latter technique, since each of the long narrow striped domains has a size of approximately 100 μm, it is too large to actually apply to matrix-type display elements. Further, since the striped domains exist inside a pixel at random, it is impossible to obtain the same gray level in a plurality of regions. Therefore, it is also difficult for the latter technique to actually provide gray scale display.

As described above, none of the above-mentioned techniques provide a structure that is capable of controlling the areas of switching domains uniformly over a wide range; therefore, it is impossible to display gray shades over a wide range, even though gray shades can be locally obtained.

SUMMARY OF THE INVENTION

The present invention has been made in order to solve the above-mentioned problems, and its first objective is to provide a liquid crystal display element that allows for a gray scale display suitable for practical use by minimizing the domain size to a great degree as compared with the pixel size and by making the domain distribution uniform over a wide range, as well as providing a manufacturing method thereof.

In order to achieve the first objective, a liquid crystal display element of the present invention is provided with: a pair of insulating substrates, each having an electrode formed thereon; an alignment film that is formed in a manner so as to cover the electrode; a liquid crystal layer that is interpolated between the substrates; and a plurality of pixels, each being constituted of the paired electrodes that are aligned face to face with each other between the two substrates and the liquid crystal layer, and the liquid crystal layer contains liquid crystal molecules and isotropic micro structural elements that locally give different threshold-value characteristics to the liquid crystal molecules.

In the above-mentioned arrangement, since the isotropic micro structural elements exist in the liquid crystal layer at random without having orientation anisotropy, they are not orientated together with liquid crystal molecules in the liquid crystal layer. Therefore, the isotropic micro structural elements impart to the liquid crystal molecules threshold-value characteristics that are locally different over a wide range. Further, domains that are to be formed in the liquid crystal layer become miniaturized. Therefore, the uniformity of the domain size can be controlled, and upon application of a pulse voltage, the areas of the domains can be desirably controlled by using at least either the pulse height or the pulse width. Furthermore, it is possible to make the size of each domain sufficiently finer than the size of a pixel.

Therefore, when the present liquid crystal display element is adopted, it becomes possible to achieve gray scale display suitable for practical use.

In order to impart to the liquid crystal molecules the threshold-value characteristics that are locally different, it is preferable to arrange the isotropic micro structural elements to have a striped structure. Since this structure allows the isotropic micro structural elements to be distributed in a striped manner in the liquid crystal layer, it is possible to form finer domains in accordance with the striped structure. Here, in order to arrange the isotropic micro structural elements so as to have a striped structure, it is preferable to set the content of the isotropic micro structural elements in the liquid crystal layer is set in the range of 0.1 to 5% by weight.

Further, each isotropic micro structural element is preferably made of a polymer containing an optically active compound. With this arrangement, the isotropic micro structural elements, which exist independently without being resolved in the liquid crystal, give great effects on the value of spontaneous polarization of liquid crystal molecules in the same manner as a chiral dopant. More specifically, in the liquid crystal layer, portions of the liquid crystal molecules contacting the isotropic micro structural elements and their peripheral portions are affected by the optical active compound. This allows the liquid crystal layer to easily obtain the threshold-voltage characteristics locally, thereby making it possible to easily control the domains. In order to achieve this feature, the content of the optical active compound in the polymer is set in the range of 50 to 100% by weight.

The isotropic micro structural elements are constituted of a polymer that is made by, for example, polymerizing a monofunctional monomer. In the polymer, respective monomer molecules are coupled to one another at the polymerizable portions, and distributed in a random state so that the isotropic micro structural elements are formed. Here, a monofunctional monomer refers to a monomer that has at lease one polymerizable functional group in each molecule.

In the polymer, it is preferable that at least one kind of monofunctional monomer is made of optically active molecules. This arrangement is made so as to allow the liquid crystal to easily obtain the threshold-voltage characteristics locally as described above. Further, in order to exert local changes in the threshold-voltage characteristics in the liquid crystal, it is preferable that the content of the optically active molecules in the monofunctional monomer is set in the range of 50 to 100% by weight.

Moreover, the liquid crystal layer may also preferably contain a ferroelectric liquid crystal composition (hereinafter, referred to as FLC composition). In such a liquid crystal layer, the isotropic micro structural elements are dispersed in a sandwiched manner between smectic layers in the FLC composition (chiral smectic C liquid crystal) so that a striped structure in a direction perpendicular to the normal to the smectic layers is formed. This structure makes it possible to easily control the domains in the FLC composition. Therefore, it becomes possible to achieve a gray scale display suitable for practical use in a matrix-type FLC display element.

The above-mentioned FLC composition is preferably provided with smectic layers having a chevron structure in which the layers point in a rubbing direction and each liquid crystal molecule in the smectic layers tilts with respect to the surfaces of the substrates toward the side on which the smectic layers are bent so as to have an identical pre-tilt angle.

The smectic layers have a so-called C2 orientation. In the smectic layers, liquid crystal molecules that are located in the vicinity of the substrate do not move, or hardly move, because they are affected by the interface between the substrate and the smectic layers. For this reason, movable liquid crystal molecules are limited to those liquid crystal molecules that are located at regions except for the region in the vicinity of the interface; thus, it is possible to increase the switching speed. Consequently, it becomes possible to provide an FLC display element having high responsibility.

The FLC composition is preferably provided with a negative dielectric anisotropy so that the voltage vs. memory-pulse width curve has a minimum value. In the FLC composition, supposing that the pulse width is set constant, non-switching regions are installed both on the low-voltage side and the high-voltage side, and a switching region is provided in between. With this arrangement, when the non-switching region on the high-voltage side is used, the degree of stability in the non-switching state (holding state) is increased. Consequently, it is possible to reduce leakage of light and to improve contrast.

The second objective of the present invention is to provide a liquid crystal display which allows for a gray scale display suitable for practical use by minimizing the domain size to a great degree as compared with the pixel size and by making the domain distribution uniform over a wide range, as well as allowing the gray scale display to be easily controlled.

In order to achieve the second objective, a liquid crystal display of the present invention is provided with any of the liquid crystal display elements as described above and a voltage-applying means for applying a pulse voltage to the pixels, with at least one of the height and width of said pulse voltage being made variable.

In such a liquid crystal display, fine domains are generated by the isotropic micro structural elements (striped structure) upon application of a pulse voltage. Further, since the threshold-value characteristics in the liquid crystal layer are locally different due to the isotropic micro structural elements, the areas of domains expand or the number of domains increases, as the width (duration) or the height (voltage level) of the pulse voltage that is applied by the voltage-applying means is increased. This makes the switching region gradually expand. Such an expansion of the switching region (domain) is made to occur in a regular manner by the striped structure that is constituted by the isotropic micro structural elements; thus, the uniformity is available over a wide region.

Therefore, when the present liquid crystal device is adopted, it becomes possible to easily control the gray scale display by applying a pulse voltage.

The third objective of the present invention is to provide a manufacturing method of liquid crystal display elements for easily obtaining a liquid crystal display element that allows for a gray scale display suitable for practical use by minimizing the domain size to a great degree as compared with the pixel size and by making the domain distribution uniform over a wide range.

In order to achieve the third objective, a manufacturing method of a liquid crystal display element of the present invention has the steps of: bonding paired insulating substrates face to face with each other, each substrate being provided with an electrode formed thereon and an alignment film formed in a manner so as to cover the electrode; filling the space between the paired substrates with a mixture that has been made by mixing a liquid crystal composition with a monofunctional monomer; and then polymerizing the monofunctional monomer by irradiating the mixture with light.

In the first manufacturing method, upon irradiation of the mixture with light that has been filled between the two substrates, the monofunctional monomer is polymerized to form a polymer. In the polymer, the respective molecules are distributed at random so that isotropic micro structural elements are formed. The isotropic micro structural elements allow the liquid crystal to easily obtain the threshold-voltage characteristics locally, as described earlier; therefore, the uniformity of the domain size can be controlled, and the areas of the domains can be desirably controlled upon application of a pulse voltage.

Therefore, when the first manufacturing method is adopted, it becomes possible to easily obtain a liquid crystal display element that allows for a gray scale display suitable for practical use.

Moreover, upon irradiation of the mixture with light, when the temperature is set to a temperature at which the liquid crystal composition exhibits a nematic phase or an isotropic phase, the isotropic micro structural elements are formed, with the monofunctional monomer being polymerized without being orientated inside the smectic layers. Then, the mixture, which has been subjected to the irradiation with light, is cooled off, and during the cooling process, the isotropic micro structural elements are arranged to have a striped structure.

In the first manufacturing method, in the case of a low concentration of the monofunctional monomer, even if the mixture is irradiated with light under a temperature at which the liquid crystal composition exhibits a nematic phase or under a temperature at which it exhibits an isotropic phase and then cooled off, it is sometimes difficult to form the striped structure.

The fourth objective of the present invention is to provide a manufacturing method of liquid crystal display elements for easily obtaining a liquid crystal display element that allows for a gray scale display suitable for practical use by minimizing the domain size to a great degree as compared with the pixel size and by making the domain distribution uniform over a wide range, even when a mixture having a low concentration of a monofunctional monomer is used.

In order to achieve the fourth objective, another manufacturing method of a liquid crystal display element of the present invention has the steps of: bonding paired insulating substrates face to face with each other, each substrate being provided with an electrode formed thereon and an alignment film formed in a manner so as to cover the electrode; filling the space between the paired substrates with a mixture that has been made by mixing a liquid crystal composition with a monofunctional monomer; irradiating the mixture with light under a temperature at which the liquid crystal composition exhibits a nematic phase or under a temperature at which it exhibits an isotropic phase, and then cooling off the mixture; and further heating the mixture to a temperature at which the liquid crystal composition exhibits an isotropic phase.

In the second manufacturing method, the mixture, which has been put into the space between the paired substrates, is irradiated with light, and then cooled off, and further the mixture is again heated under a temperature at which the liquid crystal composition exhibits an isotropic phase; thus the isotropic micro structural elements are distributed in a striped manner. Therefore, with such isotropic micro structural elements, even when a liquid crystal display element is manufactured by using the mixture whose monofunctional monomer has a low concentration, the uniformity of the domain size can be controlled, and the areas of the domains can be desirably controlled upon application of a pulse voltage.

Therefore, when the second manufacturing method is adopted, it is possible to easily obtain a liquid crystal display element that allows for a gray scale display suitable for practical use.

In the above-mentioned two manufacturing methods, when an FLC composition is used as the liquid crystal composition, the isotropic micro structural elements are arranged to have a striped structure in a sandwiched manner between smectic layers in the FLC composition. This structure makes it possible to easily control the domains in the FLC composition, as described earlier. Therefore, it is possible to easily obtain an FLC display element that allows for a proper gray scale display.

For a fuller understanding of the nature and advantages of the invention, reference should be made to the ensuing detailed description taken in conjunction with the accompanying drawings.

BRIEF DESCRIPTION OF THE DRAWINGS

FIGS. 10(a) through 10(f) are explanatory drawings that show the change of domains in response to the pulse width as a result of application of the driving voltage of FIG. 9 to the liquid crystal cell of Example 3 of the present invention.

FIGS. 11(a) through 11(c) are explanatory drawings that show the change of domains in a commonly-used FLC composition.

FIGS. 12(a) through 12(c) are explanatory drawings that show the change of domains in a conventional liquid crystal display element that has three-dimensional micro structural elements.

DESCRIPTION OF THE EMBODIMENTS

Referring to FIGS. 1 through 10, the following description will discuss one embodiment of a present invention.

Figure 1:
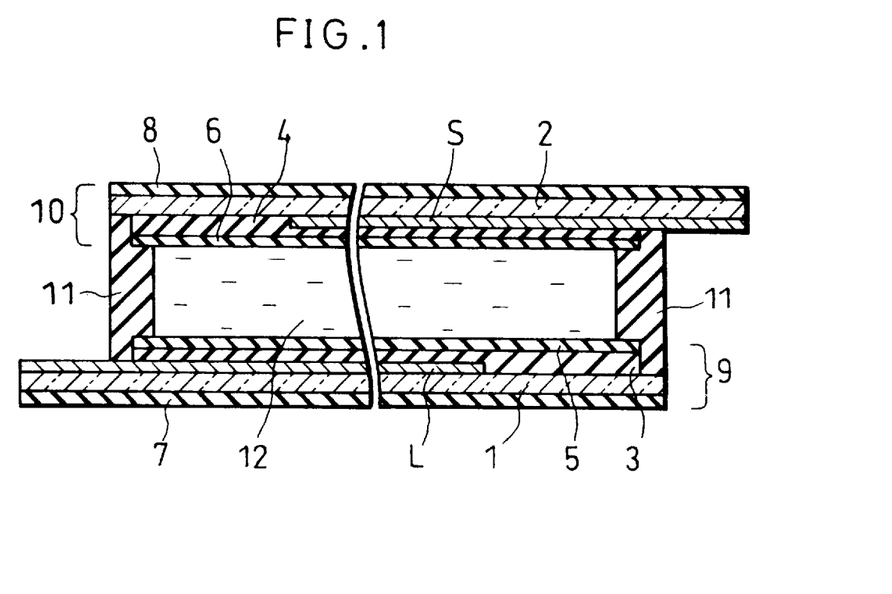
FIG. 1 is a cross-sectional view showing a construction of a liquid crystal cell in accordance with one embodiment of the present invention.

The liquid crystal display element (hereinafter, referred to as the liquid crystal cell) of the present embodiment has a structure as illustrated in FIG. 1. Here, FIG. 1 shows the structure of a liquid crystal cell corresponding to one pixel.

The liquid crystal cell is provided with two substrates 1 and 2 that have a light-transmitting property and an insulating property. The substrates 1 and 2 are normally made of glass substrates having a high light-transmitting property.

Electrodes L and S, each of which is made of a transparent dielectric film, are formed on the respective surfaces of the substrates 1 and 2. The electrodes L and S are formed by using materials, such as $InO_3$, $SnO_2$, and ITO (Indium Tin Oxide), that are formed into a predetermined pattern by the CVD (Chemical Vapor Deposition) method or the sputtering method. The thickness of each of the electrodes L and S is preferably set in the range of 50 to 200 nm.

Transparent insulating films 3 and 4, each of which has a thickness of 50 to 200 nm, are formed on the respective electrodes L and S. Inorganic thin-films made of materials, such as $SiO_2$, $SiN_x$, $Al_2O_3$, and $Ta_2O_5$, or organic thin films made of materials, such as polyimide, photoresist resin and high molecular liquid crystal, are used as the electrodes L and S.

The insulating films 3 and 4, when made of inorganic thin-films, are formed by methods, such as the vapor deposition method, the sputtering method, the CVD method and the solution-applying method. On the other hand, the insulating films 3 and 4, when made of organic thin-films, are formed by applying a solution of an organic substance or its precursor using the spinner coating method, the dip coating method, the screen printing method, the roll coating method or other methods, and by setting the coat under predetermined setting conditions (heat, light irradiation, etc.). Further, the formation of the insulating films 3 and 4 made of organic thin-films may also be carried out by the vapor deposition method, the sputtering method, the CVD method, the LB (Langumuir-Blodgett) method or other methods.

Here, it is possible to omit the insulating films 3 and 4.

Alignment films 5 and 6 are formed with a thickness of 10 to 100 nm on the insulating films 3 and 4. In the case when the insulating films 3 and 4 are omitted, the alignment films 5 and 6 are directly formed on the electrodes L and S.

The alignment films 5 and 6, when made of inorganic thin-films, are formed by a prior art film-forming method wherein silicon oxide is used. The film-forming method is, for example, an oblique evaporation method, a rotation evaporation method, (a rotation oblique evaporation method) or other methods. The alignment films, 5 and 6, when made of organic thin-films, are formed by using materials, such as nylon, polyvinyl alcohol and polyimide, and a rubbing process is normally applied to the upper surface thereof.

Moreover, the alignment films 5 and 6 may be formed by using high molecule liquid crystal or LB films. In this case, an alignment process, which uses a magnetic-field applying method, a spacer edge method, or other methods, is applied thereto. Furthermore, the alignment films 5 and 6 may also be made by forming $SiO_2$, $SiN_x$, or other materials as films by using the vapor deposition method, the sputtering method, the CVD method or other methods, and by applying a rubbing process to the upper surface thereof.

Polarization films 7 and 8 are formed on the respective surfaces opposite to the surfaces having the electrodes L and S in the substrates 1 and 2. The polarization films 7 and 8 are installed so as to optically recognize the switchover of light axes in the liquid crystal that occurs when voltage is selectively applied to the electrodes L and S.

An electrode substrate 9 is constituted by the above-mentioned substrate 1, the electrode L, the insulating film 3, the alignment film 5 and the polarization film 7. On the other hand, an electrode substrate 10 is constituted by the above-mentioned substrate 2, the electrode S, the insulating film 4, the alignment film 6 and the polarization film 8.

The electrode substrates 9 and 10 are bonded to each other through a seal member 11 in a manner so as to face with a predetermined interval in between. The space, formed between the electrode substrates 9 and 10, is filled with a mixture containing an FLC (Ferroelectric Liquid Crystal) component; thus a liquid crystal layer 12 is formed.

Figure 2:
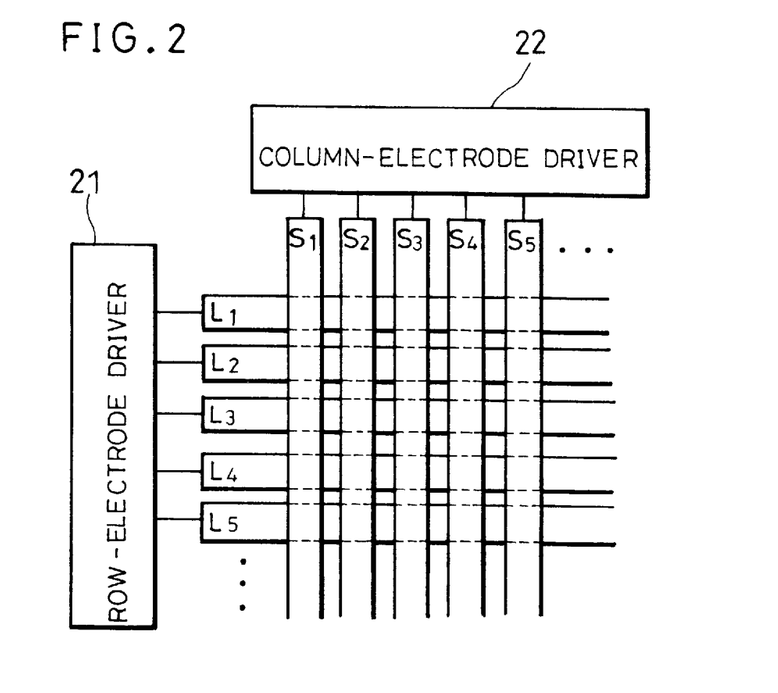
FIG. 2 is a block diagram showing arrangements of electrodes and electrode drivers in the liquid crystal cell of FIG. 1.

As illustrated in FIG. 2, in order to arrange a plurality of pixels in a liquid crystal cell of the present embodiment, the plural electrodes L ($L_1$, $L_2$, . . . etc.) are aligned in parallel with one another in the row direction, and the plural electrodes S ($S_1$, $S_2$, . . . etc.) are also aligned in parallel with one another in the column direction in a manner so as to orthogonally intersect the electrodes L. With the electrode arrangement having such a matrix format, a pixel is formed at each portion at which the electrode L and the electrode S intersect each other. Thus, each pixel has a construction in which the liquid crystal layer 12 is sandwiched by the electrodes L and S. Therefore, a number of pixels are formed by installing a number of the electrodes L and S, which makes it possible to provide display with a large capacity.

The electrodes L are connected to a row-electrode driver 21, and the electrodes S are connected to a column-electrode driver 22. The row-electrode driver 21, which functions as a voltage-applying means, successively applies to the electrodes L selection voltages (column voltages) for selecting the electrodes L. On the other hand, the column-electrode driver 22, which also functions as a voltage-applying means, applies to the electrodes S voltages (row voltages) for switching the operational states of the liquid crystal layer 12.

Pulse voltages are applied to the liquid crystal layer 12 by the row-electrode driver 21 and the column-electrode driver 22. The pulse voltages are allowed to have desired waveforms in which the width (duration) and the height (voltage level) are variable, by combining the row voltage and the column voltage.

Here, the above-mentioned liquid crystal layer 12 contains isotropic micro structural elements that are made of an FLC composition and a polymer. The isotropic micro structural elements, which will be described in detail in Examples, are formed by polymerizing a photopolymerizable monomer (hereinafter, referred to simply as a monomer) with irradiation of light.

Figure 3:
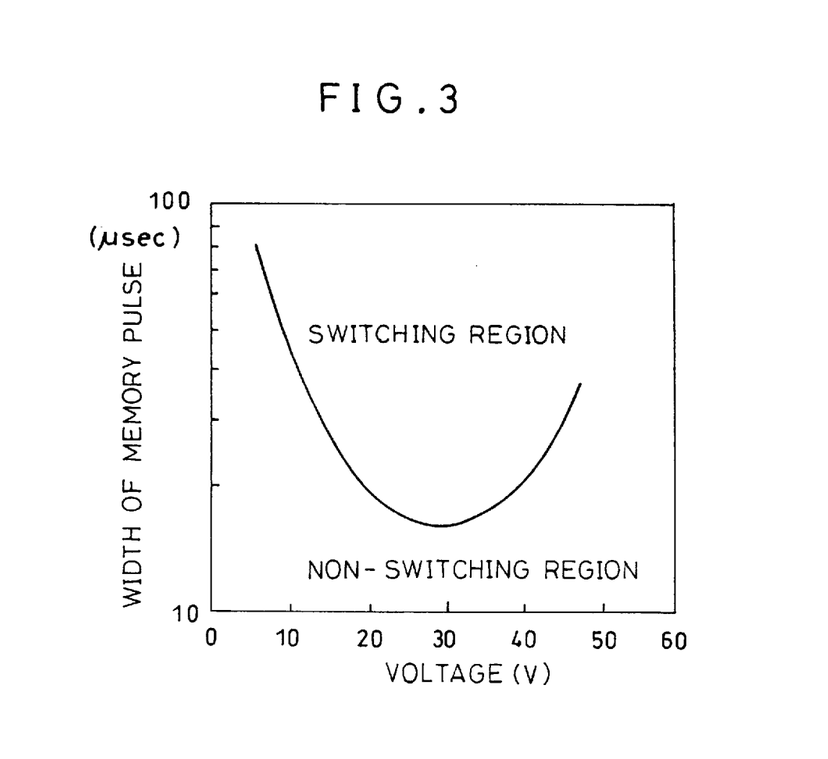
FIG. 3 is a graph that indicates the voltage vs. memory-pulse width characteristics of a pulse voltage that is applied to the liquid crystal cell of FIG. 1.
Figure 4:
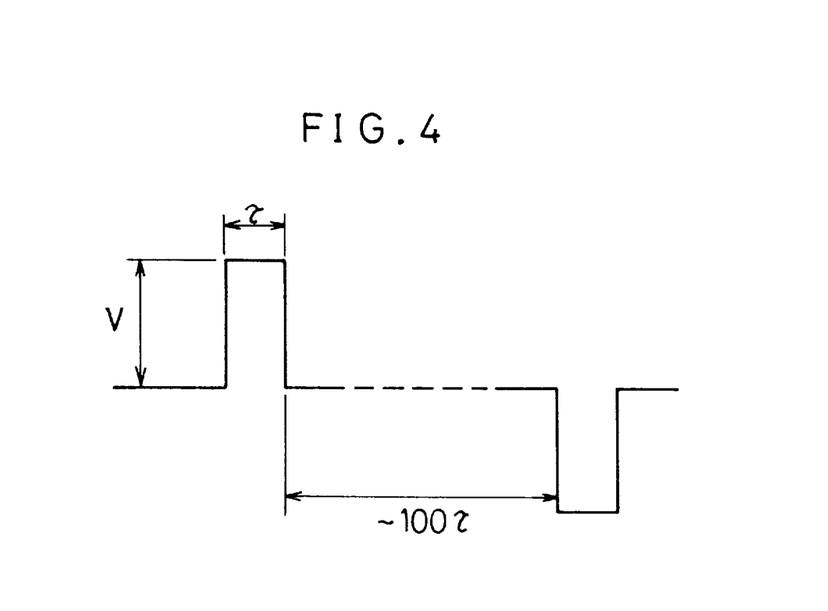
FIG. 4 is a waveform diagram that indicates a waveform of a pulse voltage that is applied upon measuring the operational characteristics of the liquid crystal cell of FIG. 1.

The FLC composition, used in the present embodiment of the invention, exhibits a negative dielectric anisotropy, and also exhibits a voltage vs. memory-pulse width characteristic which has a minimum value as shown in FIG. 3, upon application of a pulse voltage. The pulse voltage, applied at this time, is a voltage which has a waveform with different polarities at predetermined intervals, as shown in FIG. 4. Additionally, the memory-pulse width, which is indicated on the y-axis in the voltage vs. memory-pulse width characteristic of FIG. 3, is a pulse width that is required for allowing liquid crystal molecules to have a 100% switching capability upon application of a certain pulse voltage.

The FLC composition, which exhibits the above-mentioned characteristic, allows to select a switched state on the low-voltage side and also to select a non-switched state on the high voltage side, on condition that the pulse width is made constant. With this arrangement, the higher the voltage, the higher degree of stability in the non-switched state, that is, in the holding state, is obtained, and consequently, it becomes possible to reduce fluctuations in liquid crystal molecules to a great degree. Therefore, it is possible to reduce leakage of light by using the above-mentioned FLC composition.

In contrast, in a commonly-used FLC composition, the pulse width varies virtually in inverse proportion to the voltage, thereby exhibiting a voltage vs. memory-pulse width characteristic which does not have a minimum value. Therefore, such an FLC composition only allows to select a non-switched state on the low-voltage side and to select a switched state on the high-voltage side, on condition that the pulse width is made constant. The non-switched state on the low-voltage side tends to cause fluctuations in liquid crystal molecules, thereby resulting in an increased leakage of light and degradation in contrast.

Figure 5:
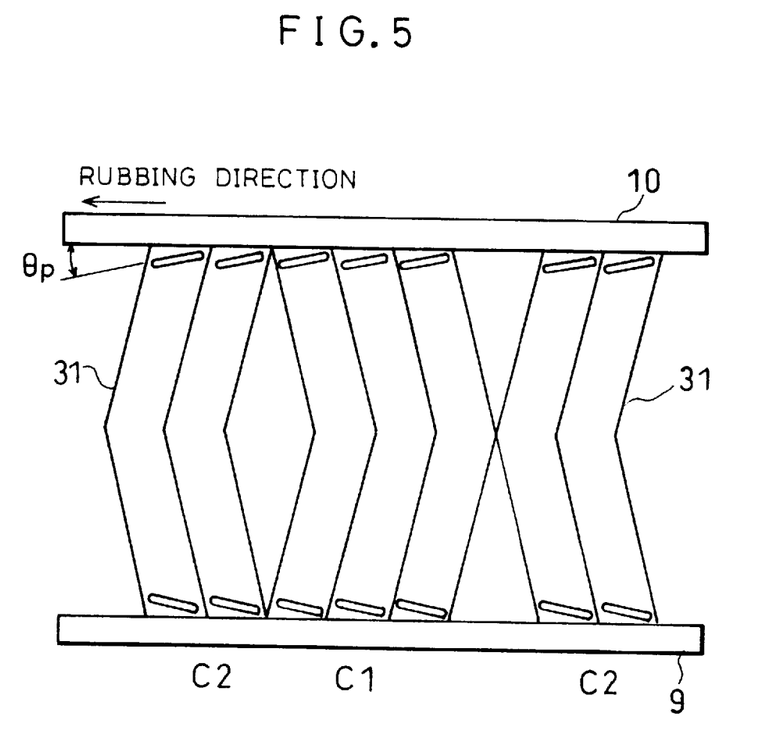
FIG. 5 is an explanatory drawing that shows smectic layers that is formed to have a chevron structure in the liquid crystal cell of FIG. 1.
Figure 6:
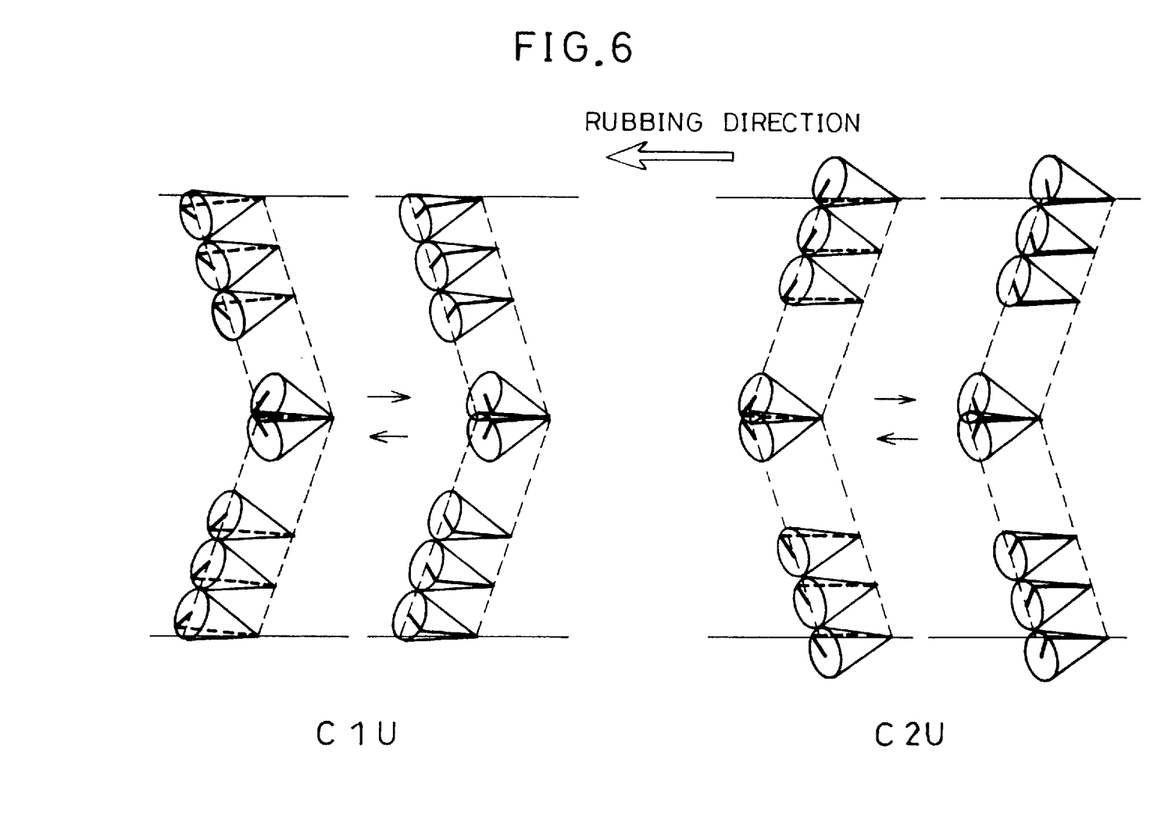
FIG. 6 is an explanatory drawing that shows an orientated state of liquid crystal molecules in the smectic layers in FIG. 5.

Further, as illustrated in FIG. 5, the FLC composition has a chevron structure wherein the smectic layers 31 are bent at their center portions between the electrode substrates 9 and 10. Such a chevron structure includes C2 orientation wherein the bends take place in the same direction as the rubbing direction and C1 orientation wherein the bends take place in a direction opposite to the rubbing direction. As illustrated in FIG. 6, in the C1 orientation and the C2 orientation, liquid crystal molecules are uniformly orientated to form C1U (C1-Uniform) orientation and C2U (C2-Uniform) orientation.

In the case of C1 orientation, liquid crystal molecules in the vicinity of the electrode substrates 9 and 10 are allowed to easily move since they are hardly affected by the interfaces between the electrode substrates 9·10 and the smectic layers 31. For this reason, since liquid crystal molecules in the smectic layers 31 are all allowed to move, switching delay tends to occur.

In contrast, in the case of C2 orientation, liquid crystal molecules in the vicinity of the electrode substrates 9 and 10 are not allowed to move, or hardly allowed to move, since they are affected by the interfaces between the electrode substrates 9·10 and the smectic layers 31. For this reason, in the smectic layers 31 only the liquid crystal molecules that are located at portions except for the portions in the vicinity of the interfaces, are allowed to move; therefore, it is possible to increase the switching speed as compared with the case of C1 orientation.

Thus, in the present liquid crystal cell, it is preferable for the smectic layers 31 to have C2 orientation (C2U orientation) in a unified manner. Further, a pre-tilt angle θp is imparted to the liquid crystal molecules so that each molecule tilts toward the side on which the smectic layers 31 with C2 orientation are bent.

With respect to the monomer, for example, acrylate, methacrylate or epoxy compounds are used. These are monofunctional compounds each of which has one polymerizable portion in each molecule, and also has a polymerization property upon irradiation with light.

The above-mentioned monomers may be respectively adopted independently, or may be adopted by mixing not less than two kinds thereof. However, in the case when one kind of monomer is independently adopted, each monomer is required to have at least one asymmetric carbon atom in each molecule and also to have an optically active property. Further, in the case when not less than two kinds of the above-mentioned monomers are used in a mixed manner, at least one kind of the monomer molecules have to be optically active molecules. In the case of two kinds of the monomers in a mixed manner, a polymer or an oligomer may be added thereto, if necessary.

It is preferable for the above-mentioned monomers to have no liquid crystal property, and also to exist as liquid at room temperature. Thus, the polymer, which is made by polymerizing the monomer(s), does not exhibit liquid crystal properties and is freezed to glass state. Consequently, the isotropic micro structural elements are easily distributed into a striped structure in a sandwiched manner between the smectic layers.

The above-mentioned mixture preferably contains a monomer in the range of 0.1 to 10% by weight, and more preferably contains a monomer in the range of 0.1 to 5% by weight, although the content depends on the characteristics of a desired liquid crystal cell. In the case of the content of a monomer less than 0.1% by weight, the formation of the isotropic micro structural elements is insufficient, thereby failing to obtain a striped structure. Moreover, in the case of the content of a monomer not less than 10% by weight, disturbances in the orientation and degradation in the responsibility tend to occur.

The content of an optically active compound in the monomer is preferably set in the range of 50 to 100% by weight (while the content of non-optically-active compound is set in the range of 0 to 50% by weight.) In the case of a content less than 50% by weight, local changes in the threshold-value characteristics are not raised in a sufficient manner in the liquid crystal layer 12.

A photopolymerization initiator is added to the above-mentioned mixture. A material, such as Irgacure-184, Irgacure-651, Irgacure-907, Tagrocure-1173, Tagrocure-1116 or Tagrocure-1959 (all manufactured by Merck & Co., Inc.) is used as the initiator. The mixing rate of the initiator is preferably set approximately in the range of 0.1 to 3% by weight with respect to the mixture. This is because insufficient initiator fails to properly initiate the reaction, while too much initiator leaves its decomposed matters as impurities even when the reaction is finished.

Although the method for charging the mixture into the liquid crystal cell is not particularly limited, the following methods are, for example, used: One is a method in which after the electrode substrates 9 and 10 have been bonded to each other through the seal member 11, the mixture is injected thereto by a vacuum injection method or other methods. The other is a method in which after having coated one of the substrate 9 (or 10) with the mixture by using a printing method or other methods, the other substrate 10 (or 9) is bonded thereto by the seal member 11.

Additionally, when the electrode substrates 9 and 10 are bonded to each other, spacers, not shown, may be sprayed between the electrode substrates 9 and 10 in order to maintain the thickness (cell gap) of the liquid crystal layer 12 constant. The diameter of each spacer is set in the range of 1 to 30 μm, and more preferably set in the range of 1 to 5 μm.

The following description will discuss a treatment process of the liquid crystal layer 12.

First, a mixture is produced by mixing a composition (FLC composition) exhibiting a ferroelectric liquid crystal phase as a liquid crystal composition with a monomer, and the mixture is charged between the electrode substrates 9 and 10. Next, the monomer is polymerized by irradiating the mixture with light, such as ultraviolet light. In this case, the liquid crystal cell is heated up to a temperature at which the FLC composition exhibits a nematic phase or an isotropic phase, and then is cooled off gradually to room temperature in a sufficient period of time.

Figure 7A:
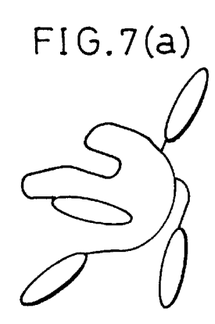
FIG. 7(a) is an explanatory drawing that shows a polymer that is produced in the liquid crystal cell of FIG. 1.
Figure 7B:
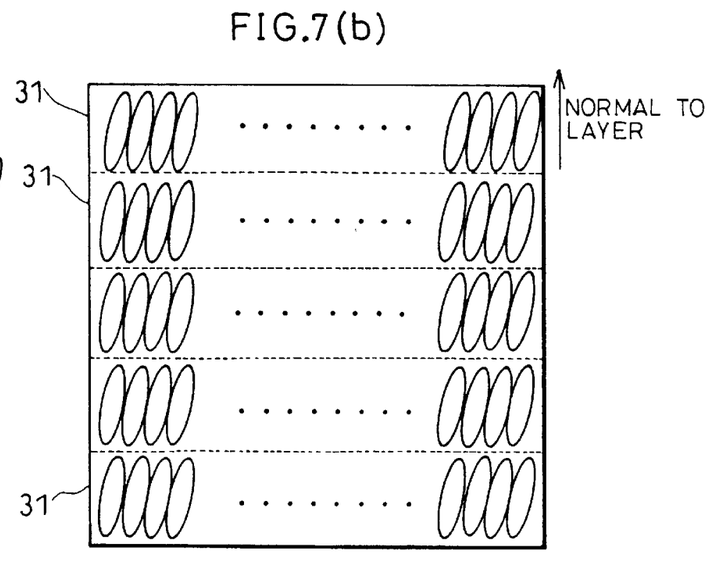
FIG. 7(b) is an explanatory drawing that shows a liquid crystal layer having a smectic-layer structure.
Figure 7C:
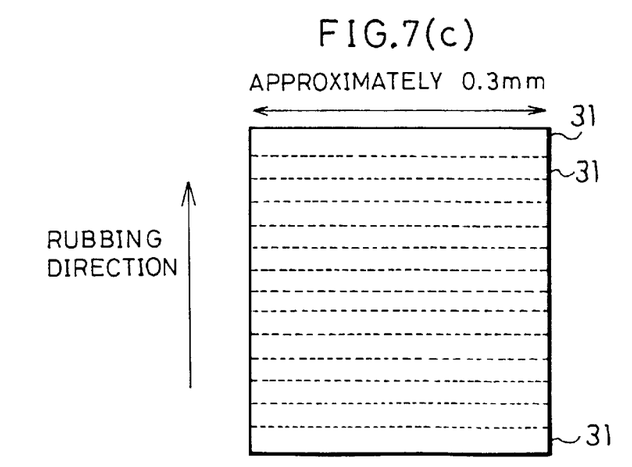
FIG. 7(c) is an explanatory drawing that shows a striped structure that has been formed by the polymer in the liquid crystal layer of FIG. 7(b).

In the liquid crystal cell thus obtained, it was observed under a polarization microscope that there was a structure having a number of fine stripes that were aligned in a direction perpendicular to the normal to the smectic layers 31, as indicated by dashed lines in FIG. 7(c). When a monomer is polymerized under a system, such as the nematic phase or the isotropic phase, which has great thermal fluctuations, the polymer itself, thus produced, is not orientated together with the liquid crystal molecules, and as illustrated in FIG. 7(a), the molecules are distributed at random, with each molecule having no anisotropy. Thus, a structure in which the molecules of the polymer are entangled with one another in a mesh-like fashion is formed.

During the cooling process, such anisotropic micro structural elements are dispersed between the smectic layers 31 in a sandwiched manner, as illustrated in FIG. 7(b). Thus, a striped structure is formed with pitches (10 to 20 μm), as illustrated in FIG. 7(b).

When a pulse voltage, as shown in FIG. 4, is applied to the liquid crystal cell in which the above-mentioned striped structure is formed, fine domains corresponding the above-striped structure are generated. At least either the areas or the number of the domains is controlled by at least either the height V or the width τ of the pulse voltage.

When the monomer is polymerized under a temperature at which the FLC composition exhibits a phase with a high degree of order, such as a smectic phase, the polymer itself, thus produced, is orientated by a restraint that is exerted on the liquid crystal molecules. For this reason, the polymer is dispersed in the mixture, and no striped structure is formed. Even in such a state, since local threshold-value characteristics have changed in the periphery of the polymer, gray scale display is available, if limited to narrow regions. However, the expansion of domains with respect to the height or width of the pulse voltage takes place at random. For this reason, it is difficult to control the expansion of domains so that it becomes uniform in any pixel in the case when a large display area is required.

Therefore, in the present example, it is essential to subject the monomer to photopolymerization under a high temperature not less than which the FLC composition exhibits a nematic phase. With this arrangement, the isotropic three-dimensional micro structural elements are formed in a striped manner. Further, with this striped structure, the expansion of domains, which is determined by the height or width of the pulse voltage, is regularly made uniform over not exhibit liquid crystal properties and is freezed to glass state, it is easily distributed into a striped structure in a sandwiched manner between the smectic layers 31.

Additionally, the monomer that is to be mixed with the FLC composition may be a monomer having another structure, as long as it has the above-mentioned properties.

TABLE 1

|  |  | Mixture | | |
|---|---|---|---|---|
|  |  | A (wt %) | B (wt %) | C (wt %) |
| FLC Comp. | SCE-8 (Merck & Co., Inc.) | 95 | 98 | 99 |
| Photopolymerization Monomer | [structural formula] | 5 | 2 | 1 | a wide range. Moreover, as illustrated in FIG. 7(c), the striped structure is formed in a sufficiently fine fashion in the range of 0.3 mm square that forms a pixel; thus, display with gray shades is available in each pixel.

Therefore, the present liquid crystal cell, which contains the FLC composition, easily makes it possible to carry out gray scale display in an analog form by adopting the above-mentioned arrangement. Moreover, the combination of this liquid crystal cell with color filters also easily makes it possible to carry out full-color gray scale display in an analog form.

Additionally, in the present embodiment, the isotropic micro structural elements are formed by subjecting a monomer to photopolymerization; however, the isotropic micro structural elements may also be formed by using monomers that are thermally polymerized at temperatures above the nematic phase.

Referring to examples 1 through 3 as well as comparative examples 1 and 2, the following description will further discuss the present invention more specifically; however, the present invention is not intended to be limited by them.

[EXAMPLE 1]

The liquid crystal cell of the present example is manufactured as follows:

Glass substrates are used as the substrates 1 and 2, and electrodes L and S, made of ITO, are formed on the respective substrates 1 and 2 with a thickness of 1000 Å, and insulating films 3 and 4, made of SiO$_2$, are formed thereon by the spin coat method with a thickness of 1000 Å. Next, alignment films 5 and 6, made of polyimide, are applied thereon with a thickness of 500 Å, and a rubbing process is applied to the surfaces thereof.

Successively, spacers are applied to the alignment films 5 and 6 so as to provide a cell gap of 1.5 μm, and the surrounding portions of the substrates 1 and 2 are bonded to each other by seal member 11. Further, mixture A, which is made by mixing an FLC composition with a monomer as shown in Table 1, is injected between the electrode substrates 9 and 10.

The monomer, which has a structure as shown in Table 1, has no liquid crystal property, and is a liquid at room temperature. Since this monomer, when polymerized, does Then, the liquid crystal cell is heated to 90° C. on a hot plate, and is irradiated with ultraviolet light that has a wavelength of 360 nm and an intensity of 4 mW/cm$^2$ for five minutes. After irradiation with the ultraviolet light, the heating process of the hot plate is stopped, and it is cooled off down to room temperature.

In the liquid crystal cell thus obtained, it was observed under a polarization microscope that there was a structure having a number of fine stripes that were aligned in a direction perpendicular to the normal to the layers, as illustrated in FIG. 7(c).

Measurements were carried out on the transmittance with respect to the change in the pulse width by applying a pulse voltage, shown in FIG. 4, to the liquid crystal cell. Upon measurements, the pulse voltage, which had a constant value (20 V) in the height V, was applied with the width τ being varied, and the resulting intensity of transmitted light was detected by a photodiode.

Figure 8:
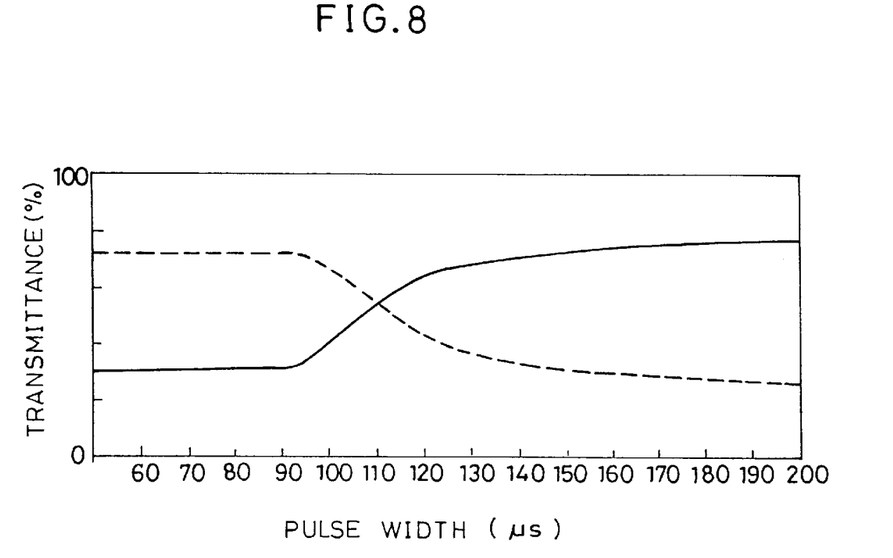
FIG. 8 is a graph that indicates pulse-width vs. transmittance characteristics that were measured in the liquid crystal cell in accordance with Example 1 of the present invention.

As a result, as illustrated in FIG. 8, characteristics in which the transmittance changes gradually upon receipt of the pulse width τ not less than 90 μm were obtained; thus, it was confirmed that gray scale display was available by using the present liquid crystal cell. Here, in FIG. 8, a solid line indicates a characteristic that is obtained when changes occur from the dark state to the bright state, and a dashed line indicates a characteristic that is obtained when changes occur from the bright state to the dark state.

As described above, in the liquid crystal cell of the present example that has a monomer concentration (content) of 5% by weight, it is possible to form a striped structure by allowing the monomer to be polymerized under a temperature at which the FLC composition exhibits a nematic phase.

Additionally, in the present example, the heating temperature upon irradiation with ultraviolet light was set to 90° C. at which the FLC composition exhibits a nematic phase (N phase). However, when another liquid crystal cell was made by setting the heating temperature upon irradiation with ultraviolet light to 100° C. at which the FLC composition exhibits an isotropic phase (Iso phase) with the other conditions being set in the same manner as those of the present example, the same striped structure as the liquid crystal cell of the present example, as illustrated n FIG. 7(c), was confirmed.

[EXAMPLE 2]

In the present example, liquid crystal cells were manufactured through the same processes by using two kinds of mixtures B and C, shown in Table 1, instead of using the mixture A in Example 1.

Although observation was carried out on the two kinds of liquid crystal cells thus obtained by using a polarization microscope, there was no structure having a number of fine stripes that were aligned in a direction perpendicular to the normal to the layers in the liquid crystal layer 12.

Next, these liquid crystal cells were again heated to 100° C. so as to allow the FLC composition to exhibit a sufficient isotropic phase, and then they were cooled off.

In these liquid crystal cells thus obtained, it was observed under a polarization microscope that there was a structure having a number of fine stripes that were aligned in a direction perpendicular to the normal to the layers in the liquid crystal layer 12.

As described above, in the case when the concentration of the monomer in the mixture was low, although merely applying the cooling process after exposure does not allow the striped structure to be formed, it was found that a striped structure was formed by applying thereafter the reheating process up to the temperature at which the FLC composition was allowed to exhibit an isotropic phase.

Additionally, in the present example, the heating temperature upon irradiation with ultraviolet light was set to a temperature at which the FLC composition exhibits a nematic phase. However, even when another liquid crystal cell was made by setting the heating temperature upon irradiation with ultraviolet light to a temperature at which the FLC composition exhibits an isotropic phase, it was sometime difficult to form a striped structure only by applying the cooling process after irradiation with ultraviolet light in the case when the monofunctional monomer had a low concentration, in the same manner as the manufacturing process of the present example. Even in such a case, when, after having applied the irradiation process with ultraviolet light and the following cooling process in the same manner as the present example, the liquid crystal layer 12 was re-heated to a temperature at which the FLC composition exhibits an isotropic phase, it was confirmed that the resulting isotropic micro structural elements were distributed in a striped manner.

[EXAMPLE 3]

Figure 9:
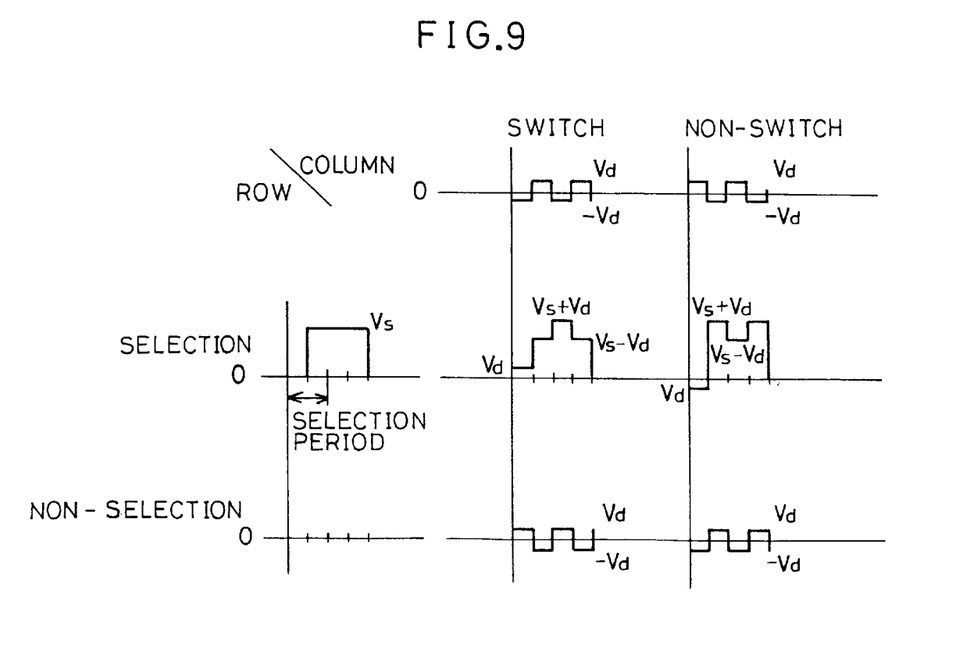
FIG. 9 is a waveform diagram that shows a waveform of a driving voltage that is applied to a liquid crystal cell in accordance with Example 3 of the present invention.
Figure 10A:
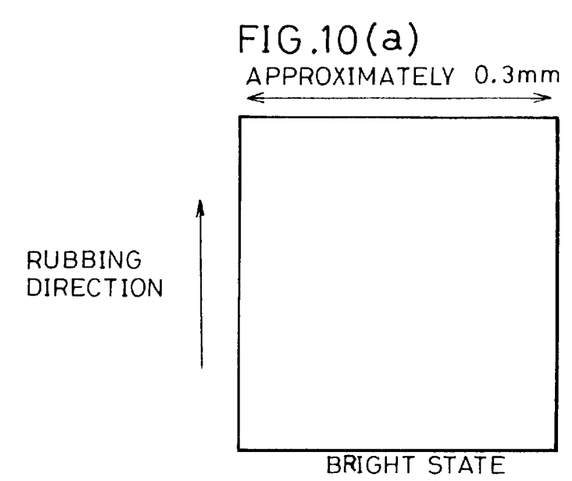
FIG. 10(a) shows the bright state of the liquid crystal cell.
Figure 10B:
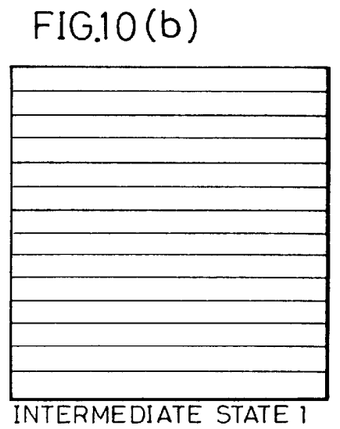
FIG. 10(b) shows one example of an intermediate state of the liquid crystal cell.
Figure 10C:
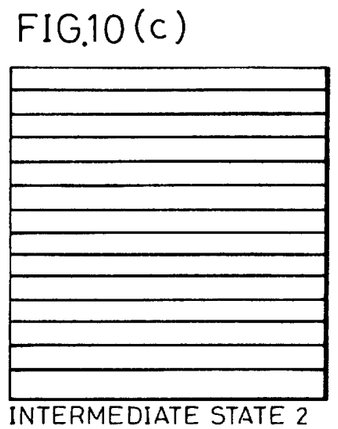
FIG. 10(c) shows another intermediate state of the liquid crystal cell.
Figure 10D:
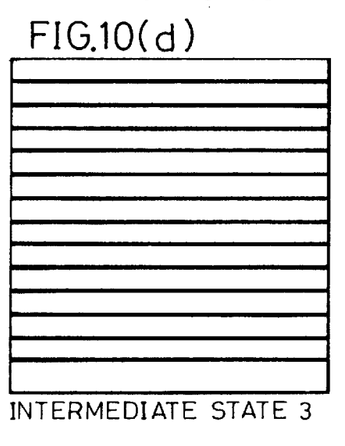
FIG. 10(d) shows still another intermediate state of the liquid crystal cell.
Figure 10E:
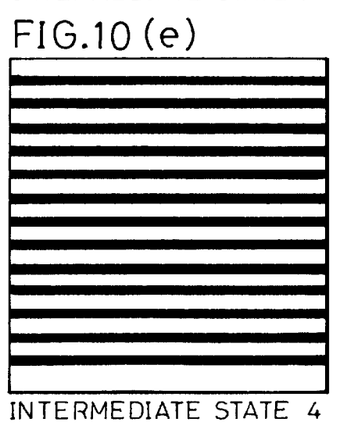
FIG. 10(e) shows still another intermediate state of the liquid crystal cell.
Figure 10F:
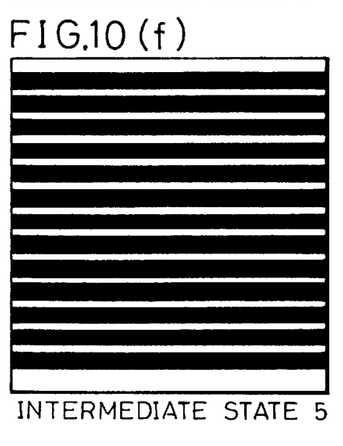
FIG. 10(f) shows the other intermediate state of the liquid crystal cell.

In the present example, the operation of the liquid crystal cell that was manufactured in Example 1 is confirmed by applying a driving voltage as shown in FIG. 9.

The driving voltage is applied as the difference between a voltage to be applied to the electrode S (column electrode) and a voltage to be applied to the electrode L (row electrode). More specifically, the voltage ($\pm V_d$), which is applied to the electrode S, includes a pulse that indicates a switched state and a pulse that indicates a non-switched state having an inverted polarity to the former pulse. On the other hand, the voltage ($V_s$) that is applied to the electrode L (row electrode) in a selected state, and in a non-selected state, no pulse is applied thereto. The above-mentioned voltages $V_d$ and $V_s$ are respectively set to 5 V and 30 V. Further, the frame frequency is set to 60 Hz.

Such a driving voltage was applied with the pulse width $\tau$ being changed (increased), and the resulting changes of domains in the liquid crystal layer 12 were observed. Consequently, the areas of domains were controlled in response to the change in the pulse width $\tau$ as shown from the bright state in FIG. 10(*a*) to intermediates states 1 through 5 in FIGS. 10(*b*) through 10(*f*); therefore, it was confirmed that gray scale display was available.

As clearly indicated by FIGS. 10(*a*) through 10(*f*), in the liquid crystal cell that was manufactured in Example 1, the size of domains is sufficiently small, and the areas of domains that are formed by the striped structure are uniform. Further, the areas of domains gradually change in response to the change in the pulse width.

[COMPARATIVE EXAMPLE 1]

In the present comparative example, a liquid crystal cell was manufactured by using the same processes as those used in Example 1 except that only the exposure temperature was changed to room temperature (25° C.).

Although this liquid crystal cell was observed under a polarization microscope, the presence of a striped structure as seen in the liquid crystal cells that was manufactured in Examples 1 and 2 was not confirmed. Further, although the operation of the present liquid crystal cell was confirmed in the same manner as Example 3, no domains along stripes were observed since no striped structure existed. Therefore, this arrangement failed to provide gray scale display.

In the present liquid crystal cell, although micro structural elements are formed, the micro structural elements do not exhibits isotropy. For this reason, the polymer in the micro structural elements are orientated together with the liquid crystal, with the result that no striped structure is formed.

Additionally, in the present comparative example, upon irradiation with ultraviolet light, the heating temperature was set to 25° C. at which the FLC composition exhibits a chiral smectic C phase ($S_c^*$ phase), and although another comparative example, in which upon irradiation with ultraviolet light, the heating temperature was set to 70° C. at which the FLC composition exhibits a smectic A phase ($S_A$ phase), was carried out, the presence of a striped structure was not confirmed in the same manner as the present comparative example.

The results of the aforementioned Example 1, Example 3 and the present comparative example are classified as shown in Table 2. In other words, in the case when the temperature (exposing temperature) upon irradiation with ultraviolet light was set to a temperature at which the FLC composition exhibits a nematic phase or to a temperature at which the FLC composition exhibits an isotropic phase (Example 1), a striped structure was formed. In contrast, in the case when the exposing temperature was set to a temperature at which the FLC composition exhibits a smectic phase (Comparative Example 1), no striped structure was formed.

Further, the operation of the liquid crystal cell of Comparative Example 1 was confirmed by applying a driving voltage thereto with the pulse width $\tau$ being changed (increased) in the same manner as Example 1. Consequently, in the liquid crystal cell of Comparative Example 1, changes in domains, as shown from the bright state in FIG. 11(*a*) to intermediate states 1 and 2 in FIGS. 11(*b*) and 11(*c*), were observed; whereas the changes of domains as shown in FIGS. 10(*b*) through 10(*f*) were observed in the liquid crystal cell of Example 1.

As indicated by FIGS. 11(*a*) through 11(*c*), in the liquid crystal cell of Comparative Example 1, the size of domains is relatively large, and the domains expand irregularly. Further, the areas of domains change abruptly in response to the change in the pulse width. For this reason, it is impossible to control the areas of domains to a desired value.

TABLE 2

| Exposing Temperature | 25° C. (S$_C$ *Phase) | 70° C. (S$_A$ Phase) | 90° C. (N Phase) | 100° C. (I$_{SC}$ Phase) |
|---|---|---|---|---|
| Presence or Absence of Striped Structure | Absence | Absence | Presence | Presence |
| Change of Domains | (FIG. 11) | (FIG. 11) | FIG. 10 | FIG. 10 |

[COMPARATIVE EXAMPLE 2]

In the present comparative example, the processes up to the bonding process of the electrode substrates 9 and 10 were carried out in the same manner as those used in Example 1, and mixture D, which had components as shown in Table 3, was injected between the electrode substrates 9 and 10. Then, the liquid crystal cell is heated to 70° C. on a hot plate, and is irradiated with ultraviolet light that have a wavelength of 365 nm and an intensity of 8 mW/cm$^2$ for five minutes. After irradiation with the ultraviolet light, the heating process of the hot plate is stopped, and it is cooled off down to room temperature.

Additionally, the photopolymerizable monomer that was used in the present comparative example was not a monofunctional monomer.

TABLE 3

| | Mixture | D |
|---|---|---|
| FLC Composition | SCE-8 (Merck & Co., Inc.) | 96 Wt % |
| Photopolymerizable Monomer | NOA-65 (Norland Inc.) | 4 Wt % |

In the liquid crystal cell that was manufactured as described above, it was confirmed by observation under a polarization microscope that the polymer disturbs the orientation of the FLC composition. For this reason, even if the driving voltage was applied to the present liquid crystal cell, it was impossible to drive the liquid crystal cell.

[RESULTS]

As described above, it was confirmed whether or not the formation of a striped structure was achieved depending on the difference in exposing temperatures. In other words, when exposure was made by using a smectic phase, neither a striped structure nor isotropic micro structural components were formed since the monomer was polymerized while being maintained in an orientated state in the smectic layers 31. Therefore, the domains in such a liquid crystal layer 12 change in the same manner as those in a commonly-used FLC composition (see FIGS. 11(b) and 11(c)).

In contrast, when exposure was made by using a nematic phase or an isotropic phase, the polymer itself, thus produced, is not orientated; therefore, isotropic micro structural elements are formed and the isotropic micro structural elements are further arranged into a striped structure during the succeeding cooling process. Thus, the domains in such a liquid crystal layer 12 change as shown in FIGS. 10(b) through 10(f). Moreover, even in the case of a monofunctional monomer with a low concentration, a striped structure can be obtained by re-heating it in an isotropic phase.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display element, which has a plurality of pixels, comprising:
    a pair of insulating substrates, each having electrodes formed thereon;
    an alignment film that is formed in a manner so as to cover the electrodes;
    a liquid crystal layer that is interpolated between the substrates; and
    a plurality of pixels, each being constituted of the paired electrodes that are aligned face to face with each other between the two substrates and the liquid crystal layer,
    wherein the liquid crystal layer contains liquid crystal molecules and isotropic micro structural elements that locally give different threshold-value characteristics to the liquid crystal molecules, and
    wherein the liquid crystal molecules are arranged so as to form smectic layers, and the isotropic micro structural elements are arranged between the smectic layers so as to have a striped structure.

2. The liquid crystal display element as defined in claim 1, wherein the isotropic micro structural elements are aligned in a direction perpendicular to a rubbing direction, so as to have a striped structure.

3. The liquid crystal display element as defined in claim 2, wherein the content of the isotropic micro structural elements in the liquid crystal layer is set in the range of 0.1 to 5% by weight.

4. The liquid crystal display element as defined in claim 2, wherein each isotropic micro structural element is made of a polymer containing an optically active compound.

5. The liquid crystal display element as defined in claim 4, wherein the content of the optically active compound in the polymer is set in the range of 50 to 100% by weight.

6. The liquid crystal display element as defined in claim 2, wherein each isotropic micro structural element is a polymer that is made by polymerizing at least one kind of monofunctional monomer.

7. The liquid crystal display element as defined in claim 6, wherein the at least one kind of monofunctional monomer is made of optically active molecules.

8. The liquid crystal display element as defined in claim 7, wherein the content of the optically active molecules in the monofunctional monomer is set in the range of 50 to 100% by weight.

9. The liquid crystal display element as defined in claim 2, wherein the liquid crystal layer contains a ferroelectric liquid crystal composition.

10. The liquid crystal display element as defined in claim 9, wherein the ferroelectric liquid crystal composition is provided with smectic layers having a chevron structure in which the layers point in a rubbing direction and wherein each liquid crystal molecule in the smectic layers tilts toward the surfaces of the substrates in the direction in which the smectic layers are bent so as to have an identical pre-tilt angle.

11. The liquid crystal display element as defined in claim 9, wherein the ferroelectric liquid crystal composition has a negative dielectric anisotropy so that the voltage vs. memory-pulse width curve has a minimum value.

12. A liquid crystal display comprising a liquid crystal display element that is defined in claim 2 and a voltage-applying means for applying a pulse voltage to the pixels, at least one of a height and width of said pulse voltage being made variable.

13. The liquid crystal display element as defined in claim 1, wherein each isotropic micro structural element is made of a polymer containing an optically active compound.

14. The liquid crystal display element as defined in claim 13, wherein the content of the optically active compound in the polymer is set in the range of 50 to 100% by weight.

15. The liquid crystal display element as defined in claim 1, wherein each isotropic micro structural element is a polymer that is made by polymerizing at least one kind of monofunctional monomer.

16. The liquid crystal display element as defined in claim 15, wherein the at least one kind of monofunctional monomer is made of optically active molecules.

17. The liquid crystal display element as defined in claim 16, wherein the content of the optically active molecules in the monofunctional monomer is set in the range of 50 to 100% by weight.

18. The liquid crystal display element as defined in claim 1, wherein the liquid crystal layer contains a ferroelectric liquid crystal composition.

19. The liquid crystal display element as defined in claim 18, wherein the ferroelectric liquid crystal composition is provided with smectic layers having a chevron structure in which the layers point in a rubbing direction and wherein each liquid crystal molecule in the smectic layers tilts toward the surfaces of the substrates in the direction in which the smectic layers are bent so as to have an identical pre-tilt angle.

20. The liquid crystal display element as defined in claim 18, wherein the ferroelectric liquid crystal composition has a negative dielectric anisotropy so that the voltage vs. memory-pulse width curve has a minimum value.

21. A liquid crystal display comprising a liquid crystal display element that is defined in claim 1 and a voltage-applying means for applying a pulse voltage to the pixels, at least one of a height and width of said pulse voltage being made variable.

22. In a manufacturing method of a liquid crystal display element having a plurality of pixels which comprises: a pair of insulating substrates, each having electrodes formed thereon; an alignment film that is formed in a manner so as to cover the electrodes; a liquid crystal layer that is interpolated between the substrates; and a plurality of pixels, each being constituted of the paired electrodes that are aligned face to face with each other between the two substrates and the liquid crystal layer, wherein the liquid crystal layer contains liquid crystal molecules and isotropic micro structural elements that locally give different threshold-value characteristics to the liquid crystal molecules, and wherein the liquid crystal molecules are arranged so as to form smectic layers, and the isotropic micro structural elements are arranged between the smectic layers so as to have a striped structure, said manufacturing method comprising the steps of:

bonding paired insulating substrates face to face with each other, each substrate being provided with electrodes formed thereon and an alignment film formed in a manner so as to cover the electrodes;

filling a space between the paired substrates with a mixture that has been made by mixing a liquid crystal composition with at least one kind of monofunctional monomer; and polymerizing the monofunctional monomer by irradiating the mixture with light.

23. The manufacturing method of a liquid crystal display element as defined in claim 22, wherein upon irradiation of the mixture with light, the temperature is set to a temperature at which the liquid crystal composition exhibits a nematic phase.

24. The manufacturing method of a liquid crystal display element as defined in claim 23, having a step wherein the mixture, which has been subjected to the irradiation with light, is cooled off.

25. The manufacturing method of a liquid crystal display element as defined in claim 22, wherein upon irradiation of the mixture with light, the temperature is set to a temperature at which the liquid crystal composition exhibits an isotropic phase.

26. The manufacturing method of a liquid crystal display element as defined in claim 25, having a step wherein the mixture, which has been subjected to the irradiation with light, is cooled off.

27. The manufacturing method of a liquid crystal display element as defined in claim 22, wherein a ferroelectric liquid crystal composition is used as the liquid crystal composition.

28. In a manufacturing method of a liquid crystal display element having a plurality of pixels which comprises: a pair of insulating substrates, each having electrodes formed thereon; an alignment film that is formed in a manner so as to cover the electrodes; a liquid crystal layer that is interpolated between the substrates; and a plurality of pixels, each being constituted of the paired electrodes that are aligned face to face with each other between the two substrates and the liquid crystal layer, wherein the liquid crystal layer contains liquid crystal molecules and isotropic micro structural elements that locally give different threshold-value characteristics to the liquid crystal molecules, and wherein the liquid crystal molecules are arranged so as to form smectic layers, and the isotropic micro structural elements are arranged between the smectic layers so as to have a striped structure, said manufacturing method comprising the steps of:

bonding paired insulating substrates face to face with each other, each substrate being provided with electrodes formed thereon and an alignment film formed in a manner so as to cover the electrodes;

filling a space between the paired substrates with a mixture that has been made by mixing a liquid crystal composition with a monofunctional monomer;

irradiating the mixture with light under a temperature at which the liquid crystal composition exhibits a nematic phase or an isotropic phase;

cooling the mixture after the irradiation with light; and heating the cooled mixture to a temperature at which the liquid crystal composition exhibits an isotropic phase.

29. The manufacturing method of a liquid crystal display element as defined in claim 28, wherein a ferroelectric liquid crystal composition is used as the liquid crystal composition.

* * * * *